United States Patent
Lichtenberg

(10) Patent No.: US 9,644,749 B2
(45) Date of Patent: May 9, 2017

(54) ASSEMBLY FOR SEALING A STEERING COLUMN OPENING

(71) Applicant: HENNIGES Automotive GmbH & Co. KG, Rehburg-Loccum (DE)

(72) Inventor: Wilhelm Lichtenberg, Hannover (DE)

(73) Assignee: Henniges Automotive GmbH & Co. KG, Rehburg-Loccum (DE)

( * ) Notice: Subject to any disclaimer, the term of this patent is extended or adjusted under 35 U.S.C. 154(b) by 0 days.

(21) Appl. No.: 14/466,740

(22) Filed: Aug. 22, 2014

(65) Prior Publication Data
US 2015/0054231 A1    Feb. 26, 2015

(30) Foreign Application Priority Data

Aug. 22, 2013 (DE) .......................... 10 2013 014 046

(51) Int. Cl.
| | |
|---|---|
| *B62D 1/20* | (2006.01) |
| *F16J 15/16* | (2006.01) |
| *F16J 15/52* | (2006.01) |
| *B62D 1/16* | (2006.01) |

(52) U.S. Cl.
CPC ................ *F16J 15/52* (2013.01); *B62D 1/16* (2013.01)

(58) Field of Classification Search
CPC ......................................................... F16J 3/04
See application file for complete search history.

(56) References Cited

U.S. PATENT DOCUMENTS

| | | | |
|---|---|---|---|
| 4,840,386 A * | 6/1989 | Peitsmeier et al. ........... | 277/636 |
| 6,056,297 A | 5/2000 | Harkrader et al. | |
| 6,328,315 B1 * | 12/2001 | Hebenstreit .................... | 277/634 |
| 7,641,561 B2 * | 1/2010 | Moriyama et al. ........... | 464/173 |
| 7,950,669 B2 * | 5/2011 | Kozlowski et al. .......... | 277/315 |
| 2008/0231003 A1 | 9/2008 | Moriyama et al. | |

FOREIGN PATENT DOCUMENTS

| | | |
|---|---|---|
| DE | 102006053265 A1 | 5/2008 |
| DE | 10 2007 052 721 A1 | 5/2009 |
| DE | 10 2012 215 087 A1 | 3/2013 |
| EP | 1538377 A1 | 6/2005 |
| JP | 2007-22323 A | 2/2007 |
| JP | 2012-17059 A | 1/2012 |

* cited by examiner

*Primary Examiner* — Gilbert Lee
(74) *Attorney, Agent, or Firm* — Muncy, Geissler, Olds & Lowe, P.C.

(57) ABSTRACT

For sealing the steering column opening in a body panel located between passenger cell and engine compartment, an assembly consists of at least one steering column mounting bearing, at least one body panel flange and at least one elastomer suspension, via which the steering column mounting bearing is suspended from the body panel flange. The body panel flange is expanded housing-like into at least one series-specifically designed reducing piece, the elastomer suspension being at least partially embodied as a series-independent universal suspension. At least two damping chambers located between the reducing piece and the steering column mounting bearing are formed with the elastomer suspension.

6 Claims, 1 Drawing Sheet

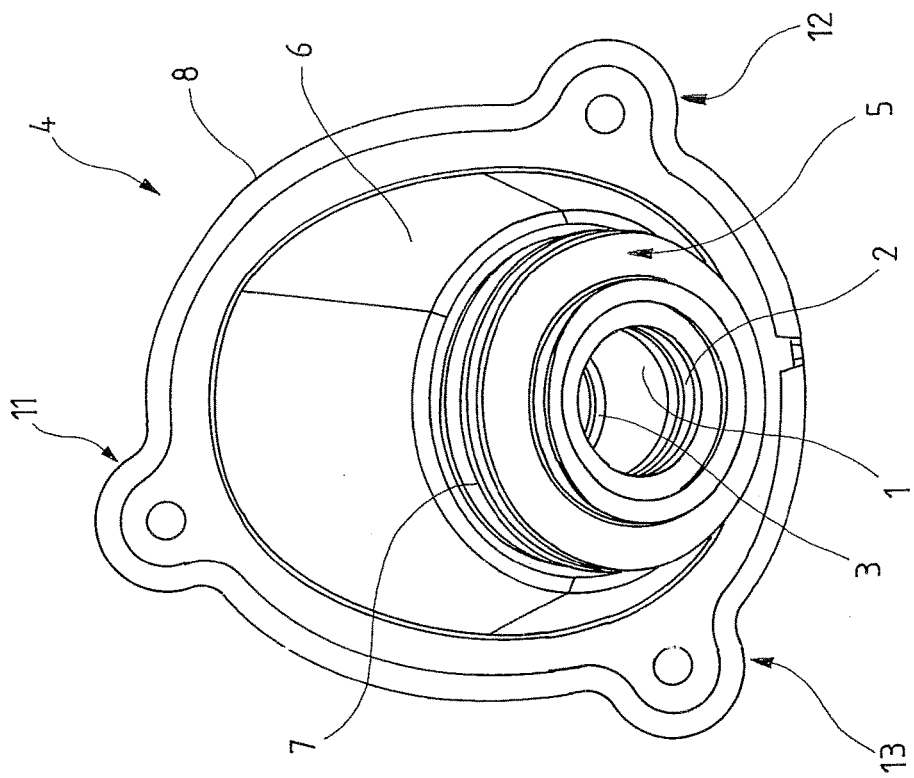
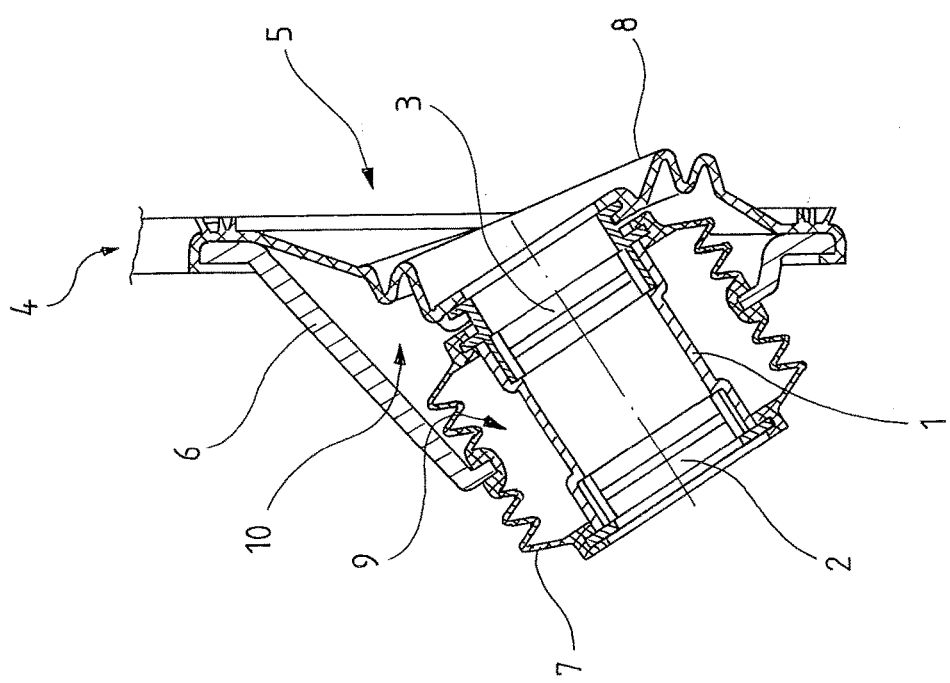

ASSEMBLY FOR SEALING A STEERING COLUMN OPENING

The invention relates to an assembly for sealing the steering column opening in a body panel located between passenger cell and engine compartment, consisting of at least one steering column mounting bearing, at least one body panel flange and at least one elastomer suspension, via which the steering column mounting bearing is suspended from the body panel flange.

The sealing regularly serves for the protection of the engine compartment from splash water and contaminations entering from the interior of the engine compartment. Accordingly, the steering column mounting bearing ensures the rotationally moveable mounting of the steering spindle within the steering column opening. The elastomer suspension by contrast ensures a radially moveable mounting of the steering column within the steering column opening. Apart from this, the elastomer suspension regularly also serves for the acoustic decoupling of a steering spindle held in the steering column mounting bearing from the body panel flange held in the steering column opening.

Since the different vehicle brands, the classes, models and series of which produce a multitude of differently designed vehicle bodies and steering columns, just as large a number of steering column installation situations result, which are taken into account through the production of series-specific assemblies. For producing each further series-specifically designed assembly, however the cost-intensive construction of further moulding and joining tools are required, so that the production cost of the known assemblies are disadvantageously high.

The invention is based on the object of showing an assembly of the generic type mentioned at the outset, the production costs of which are reduced.

This object is solved through an assembly having the features of Patent Claim 1. Advantageous further developments are stated in the subclaims reference to Patent Claim 1.

The assembly according to the invention is characterized in that the body panel flange is expanded housing-like into at least one series-specifically designed reducing piece, and in that the elastomer suspension is at least partially embodied as a series-independent universal suspension.

With its series-specific design, the reducing piece is adapted to the steering column construction situation of a single or at least of few different vehicle series. In its function as a body panel flange, the reducing piece serves for reducing the oversize formed on the steering column opening across the series to a fit dimension adapted series-specifically. Accordingly, the housing-like expansion of the reducing piece is regularly obtained from a series-specific adaptation of the reducing piece to the series-independently and thus universally designed elastomer suspension. Advantageously, this also make possible the use of a series-independently designed steering column mounting bearing, so that for developing further series merely the construction of a simple moulding tool for a changed reducing piece is required. The construction of complicated moulding and joining tools for producing entire assemblies can be advantageously omitted.

According to a first further development of the invention, at least two damping chambers located between the reducing piece and the steering column mounting bearing are formed with the elastomer suspension. These constitute a particularly effective measure for creating interferences, with which sound waves transmitted from the engine compartment into the damping chambers mutually cancel out one another.

According to a next further development of the invention, the elastomer suspension is composed of at least two bellows modules. The modular construction of the elastomer suspension advantageously makes possible a simple and therefore cost-effective series-specific adaptation to a changed steering column installation situation, since the construction of a new moulding tool is merely required for the bellows module affected by the change. The bellows modules which are not affected by the changed steering column installation situation can preferentially be employed also in the assembly servicing the changed steering column installation situation. Apart from this, the modular construction of the elastomer suspension makes possible a particularly simple and cost-effective design of the damping chambers located between the reducing piece and the steering column mounting bearing, since expensive moulding tools for producing double-walled elastomer suspensions can be omitted.

Preferentially, at least one of the bellows modules is designed as an axial sleeve which is sealed on both sides towards the steering column mounting bearing and located in between towards the reducing piece. Through the sealing of the axial sleeve on both sides to the steering column mounting bearing, a first damping chamber preferentially designed series-independently is created, which via the reducing piece in the steering column opening of a body panel is merely indirectly suspended.

The bellows module designed as an axial sleeve is preferentially a universal part of the elastomer suspension series-independently bodies as universal suspension. Accordingly, the bellows module designed as axial sleeve preferentially comprises an easily producible rotation-symmetrical component geometry. However, asymmetrical component geometries are also conceivable in principle here, if with these an improved series-specific adaptation of the reducing piece to different steering column installation situations is achieved.

According to a next further development of the invention, at least one of the bellows modules is designed as a radial sleeve which is sealed on the inside towards the steering column mounting bearing and on the outside sealed towards the reducing piece. With the radial seal, a second damping chamber which is directly located at the first damping chamber but series-specifically designed is produced, which preferentially reaches as far as to the sealing surfaces of the reducing piece interacting with a body panel. For fastening the radial sleeve on the reducing piece, the radial sleeve comprises clamping or engagement structures interacting with the reducing piece.

Since the longitudinal axes of steering columns regularly pass through the opening cross sections of steering column openings at an oblique angle, the bellows module which is designed as a radial sleeve, has an angle geometry that is adapted to a series-specific steering column installation situation. In principle, the bellows module designed as a radial sleeve can however be designed also series-independently, since the modular construction of the elastomer suspension favours a cost-effective production of bellows modules, the elastic deformation characteristics of which are specifically designed for a series-independent use.

An exemplary embodiment of the invention, from which further inventive features are obtained, is shown in the drawing. It shows:

FIG. 1 a lateral view of an assembly according to the invention in middle section; and FIG. 2 an unsectioned front view of the assembly according to FIG. 1.

FIG. 1 shows the assembly for sealing a steering column opening according to the invention in a body panel located between passenger cell and engine compartment. The assembly consists of a steering column mounting bearing 1 with two sliding bushings 2, 3, a body panel flange 4 and an elastomer suspension 5, via which the steering column mounting bearing 1 is suspended from the body panel flange 4. The body panel flange 4 is expanded housing-like into a series-specifically designed reducing piece 6, so that the elastomer suspension 5 is partly embodied as series-independent universal suspension. Accordingly, the elastomer suspension 5 is composed of two bellows modules 7, 8, with which two damping chambers 9, 10 located one behind the other in the ring gap between the reducing piece 6 and the steering column mounting bearing 1 are formed. While the bellows module 7 is designed as an axial sleeve which is sealed on both sides towards the steering column mounting 1 and located in between sealed towards the reducing piece 6, the other bellows module 8 is designed as a radial sleeve which is sealed on the inside towards the steering column mounting bearing 1 and on the outside sealed towards the reducing piece 6. The bellows module 7 designed as axial sleeve is embodied as a universal part of the elastomer suspension 5 designed series-independently and has a simple rotation-symmetrical component geometry. The bellows module designed as radial sleeve by contrast has an angle geometry which is adapted to a series-specific steering column installation situation. The series-specifically reducing piece 6 also has such an angle geometry.

FIG. 2 shows an unsectioned front view of the assembly shown in FIG. 1. This view shows that the body panel flange which is expanded housing-like into the series-specifically designed reducing piece 6 comprises three fastening straps 11, 12, 13 for the secure mounting of the assembly according to the invention corresponding to a steering column opening of a body panel. Same components are marked with same reference numbers.

All features mentioned in the above description and in the claims can be combined in any selection with the features of the independent claim. Disclosing the invention is thus not restricted to the described or claimed feature combinations, rather all feature combinations which are practical within the scope of the invention are to be considered as being disclosed.

The invention claimed is:

1. An assembly for sealing the steering column opening in a body panel located between passenger cell and engine compartment, comprising at least one body panel flange and at least one elastomer suspension, via which the steering column mounting bearing is suspended from the body panel flange, wherein the body panel flange is expanded housing-like into at least one exchangeable, detachable and series-specifically formed reducing piece, the elastomer suspension is at least partially embodied as a series-independent universal suspension, in which the elastomer suspension is composed of at least two bellows modules, and with the elastomer suspension, at least two damping chambers located between the reducing piece and the steering column mounting bearing are formed.

2. The assembly according to claim 1, wherein at least one of the bellows modules is designed as an axial sleeve which is sealed on both sides towards the steering column mounting bearing and located in between towards the reducing piece.

3. The assembly according to claim 2, wherein at least the bellows module designed as axial sleeve is embodied as a universal part of the series-independent universal suspension.

4. The assembly according to claim 2, wherein the bellows module designed as axial sleeve has a rotation-symmetrical component geometry.

5. The assembly according to claim 1, wherein at least one of the bellows modules is designed as a radial sleeve which on the inside is sealed towards the steering column mounting bearing and on the outside sealed towards the reducing piece.

6. The assembly according to claim 5, wherein the bellows module designed as radial sleeve has an angle geometry that is adapted to a series-specific steering column installation situation.

* * * * *